(12) United States Patent
Atsatt

(10) Patent No.: US 9,600,291 B1
(45) Date of Patent: Mar. 21, 2017

(54) SECURE BOOT USING A FIELD PROGRAMMABLE GATE ARRAY (FPGA)

(71) Applicant: Altera Corporation, San Jose, CA (US)

(72) Inventor: Sean R. Atsatt, Santa Cruz, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/201,016

(22) Filed: Mar. 7, 2014

Related U.S. Application Data

(60) Provisional application No. 61/784,098, filed on Mar. 14, 2013.

(51) Int. Cl.
| | |
|---|---|
| G06F 21/00 | (2013.01) |
| G06F 12/14 | (2006.01) |
| G06F 9/44 | (2006.01) |
| G06F 21/62 | (2013.01) |
| G06F 21/57 | (2013.01) |
| H04L 9/00 | (2006.01) |

(52) U.S. Cl.
CPC .......... *G06F 9/4401* (2013.01); *G06F 21/575* (2013.01); *G06F 21/6218* (2013.01)

(58) Field of Classification Search
CPC .. G06F 9/4401; G06F 21/575; G06F 21/6218; G06F 21/10; G06F 21/64; G06F 21/572; G06F 21/57; G06F 21/71; G06F 21/78; G06F 3/0679; G06F 9/00; G06F 2221/2143

See application file for complete search history.

(56) References Cited

U.S. PATENT DOCUMENTS

| | | | |
|---|---|---|---|
| 6,185,678 B1* | 2/2001 | Arbaugh et al. | 713/2 |
| 6,492,833 B1* | 12/2002 | Asson et al. | 326/41 |
| 6,711,675 B1* | 3/2004 | Spiegel et al. | 713/2 |
| 6,735,696 B1* | 5/2004 | Hannah | 713/189 |
| 7,007,300 B1* | 2/2006 | Weber et al. | 726/21 |
| 7,822,958 B1* | 10/2010 | Allen et al. | 713/1 |
| 8,250,372 B1* | 8/2012 | Muir | 713/187 |
| 8,386,759 B1* | 2/2013 | Duwel | 713/2 |
| 8,437,200 B1* | 5/2013 | Tan et al. | 365/189.07 |
| 8,736,299 B1* | 5/2014 | Pedersen | 326/8 |

(Continued)

OTHER PUBLICATIONS

Cotret, Pascal, et al. "Security enhancements for FPGA-based MPSoCs: a boot-to-runtime protection flow for an embedded Linux-based system." Reconfigurable Communication-centric Systems-on-Chip (ReCoSoC), 2012 7th International Workshop on. IEEE, 2012.*

(Continued)

*Primary Examiner* — Michael Simitoski
(74) *Attorney, Agent, or Firm* — Fletcher Yoder, P.C.

(57) ABSTRACT

This disclosure describes techniques for ensuring security in an integrated circuit system that includes a processor subsystem and a configurable-logic (e.g., FPGA) subsystem, which is capable of storing code executed by the processor. Techniques for utilizing the configurable-logic to control the process of booting a processor in the processor subsystem securely are described. Because the configurable-logic may be on the same die as the processor in the integrated circuit, the configurable-logic may securely boot the processor inside the security boundary of the package containing the die.

19 Claims, 4 Drawing Sheets

(56) References Cited

U.S. PATENT DOCUMENTS

| | | | |
|---|---|---|---|
| 8,949,586 B2* | 2/2015 | Shroff et al. | 713/2 |
| 2002/0004905 A1* | 1/2002 | Davis et al. | 713/193 |
| 2002/0034964 A1* | 3/2002 | Bannai et al. | 455/556 |
| 2002/0073316 A1* | 6/2002 | Collins et al. | 713/174 |
| 2003/0196100 A1* | 10/2003 | Grawrock et al. | 713/193 |
| 2004/0158742 A1* | 8/2004 | Srinivasan et al. | 713/201 |
| 2005/0014559 A1* | 1/2005 | Mattice et al. | 463/29 |
| 2005/0138409 A1* | 6/2005 | Sheriff et al. | 713/200 |
| 2005/0210287 A1* | 9/2005 | Paatero | 713/201 |
| 2006/0020907 A1* | 1/2006 | Tonami et al. | 717/100 |
| 2006/0026417 A1* | 2/2006 | Furusawa et al. | 713/2 |
| 2006/0090084 A1* | 4/2006 | Buer | 713/189 |
| 2006/0179302 A1* | 8/2006 | Hatakeyama | 713/164 |
| 2007/0055859 A1* | 3/2007 | Yang et al. | 713/2 |
| 2007/0130452 A1* | 6/2007 | Muir | 713/1 |
| 2007/0208926 A1* | 9/2007 | Grieve et al. | 713/1 |
| 2007/0260869 A1* | 11/2007 | Dade et al. | 713/2 |
| 2007/0300207 A1* | 12/2007 | Booth et al. | 717/126 |
| 2008/0141017 A1* | 6/2008 | McCoull et al. | 713/2 |
| 2009/0217373 A1* | 8/2009 | Stillerman | G06F 21/572 726/18 |
| 2010/0107249 A1* | 4/2010 | Krig | 726/22 |
| 2010/0122076 A1* | 5/2010 | Witty | G06F 21/575 713/2 |
| 2010/0146256 A1* | 6/2010 | Luo | G06F 12/0638 713/2 |
| 2010/0268928 A1* | 10/2010 | Wang | G06F 12/0866 713/2 |
| 2011/0126048 A1* | 5/2011 | Chou | G06F 11/0793 714/15 |
| 2011/0267190 A1* | 11/2011 | Payson et al. | 340/539.31 |
| 2012/0036372 A1* | 2/2012 | Leclercq | 713/192 |
| 2012/0102576 A1* | 4/2012 | Chew | 726/30 |
| 2012/0303941 A1* | 11/2012 | Grieco et al. | 713/2 |
| 2013/0091345 A1* | 4/2013 | Shroff | H04L 9/3234 713/2 |
| 2013/0091394 A1* | 4/2013 | Kato | 714/719 |
| 2014/0089651 A1* | 3/2014 | Yao | H04L 9/3247 713/2 |

OTHER PUBLICATIONS

Eisenbarth, Thomas, et al. "Reconfigurable trusted computing in hardware." Proceedings of the 2007 ACM workshop on Scalable trusted computing. ACM, 2007.*

Glas, Benjamin, et al. "A system architecture for reconfigurable trusted platforms." Proceedings of the conference on Design, automation and test in Europe. ACM, 2008.*

Huang, Andrew. "Keeping secrets in hardware: The microsoft xboxtm case study." Cryptographic Hardware and Embedded Systems—CHES 2002. Springer Berlin Heidelberg, 2003. 213-227.*

Peterson, Ed. "Developing tamper resistant designs with Xilinx Virtex-6 and 7 series FPGAs." Application Note. Xilinx Corporation (2013).*

* cited by examiner

US 9,600,291 B1

SECURE BOOT USING A FIELD PROGRAMMABLE GATE ARRAY (FPGA)

CROSS REFERENCE TO RELATED APPLICATION

This patent document claims the benefit of, and priority to, U.S. Provisional Application No. 61/784,098, filed Mar. 14, 2013, the disclosure of which is hereby incorporated by reference herein in its entirety.

FIELD OF USE

This disclosure relates generally to techniques for establishing data security within an integrated circuit architecture.

BACKGROUND OF THE DISCLOSURE

An integrated circuit may include a number of subsystems. For example, a system on a chip (SOC) integrated circuit may include a processor subsystem, which includes one or more processors, peripherals, memory, and hardware interfaces, and a field programmable gate array (FGPA) subsystem, which includes a programmable FPGA core and hard-IP implemented controllers and transceivers.

An integrated circuit is generally vulnerable to a software or hardware based attack in which code that is to be executed by a processor of the integrated circuit is manipulated or corrupted so that the processor performs actions other than those intended by the supplier of the integrated circuit supplier. Such vulnerabilities are magnified in SOC integrated circuit, which includes a number hardware interfaces, each a potential point of weakness for a hardware attack, and a number of memory subsystems, each a possible storage point for malicious code.

SUMMARY OF THE DISCLOSURE

The present disclosure provides methods and systems for ensuring security in an integrated circuit system that includes a processor subsystem and a configurable-logic (e.g., FPGA) subsystem, which is capable of storing code executed by the processor.

In an embodiment, an integrated circuit may include processor circuitry, including a processor and boot read only memory (ROM), and FPGA circuitry, including an FPGA core and FPGA memory. The processor may execute a first set of instructions stored in the boot ROM and a second set of boot instructions from a program object file (POF) stored in the FPGA memory, where the second set of boot instructions is executed after the FPGA core has authenticated the POF.

In response to authenticating the POF, the FPGA core may send a signal to the processor circuitry indicating that the processor circuitry may execute the second set of boot instructions. In response to failing to authenticate the POF, the FGPA core may declare boot failure. The FPGA core may hold the processor circuitry in a secure state while the FPGA core authenticates the POF.

The FPGA circuitry may include data authentication circuitry for authenticating the POF and the processor circuitry and the FPGA circuitry may be located on the same package. The boot ROM and the processor circuitry may also be located on the same die in the same package.

In an embodiment, an integrated circuit may include processor circuitry, including a processor and a boot ROM, and FPGA circuitry including an FPGA core and FPGA memory. The FPGA circuitry may receive instructions in a POF file, authenticate the POF file using data authentication circuitry, send a signal to the processor circuitry which may cause data stored in at least one writable memory block included in the processor circuitry to be scrambled, and reset the processor after scrambling the data stored in the at least one writeable memory block.

In response to failing to authenticate the POF, the FPGA core may declare boot failure. The processor may execute a first set of boot instructions stored in the boot ROM where the first set of boot instructions stored in the boot ROM may be non-secure code. The processor may execute a second set of boot instructions stored in the FPGA memory based on the POF where the second set of boot instructions stored in the FPGA memory may be secure code. The boot ROM and the processor circuitry may be located on the same die.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
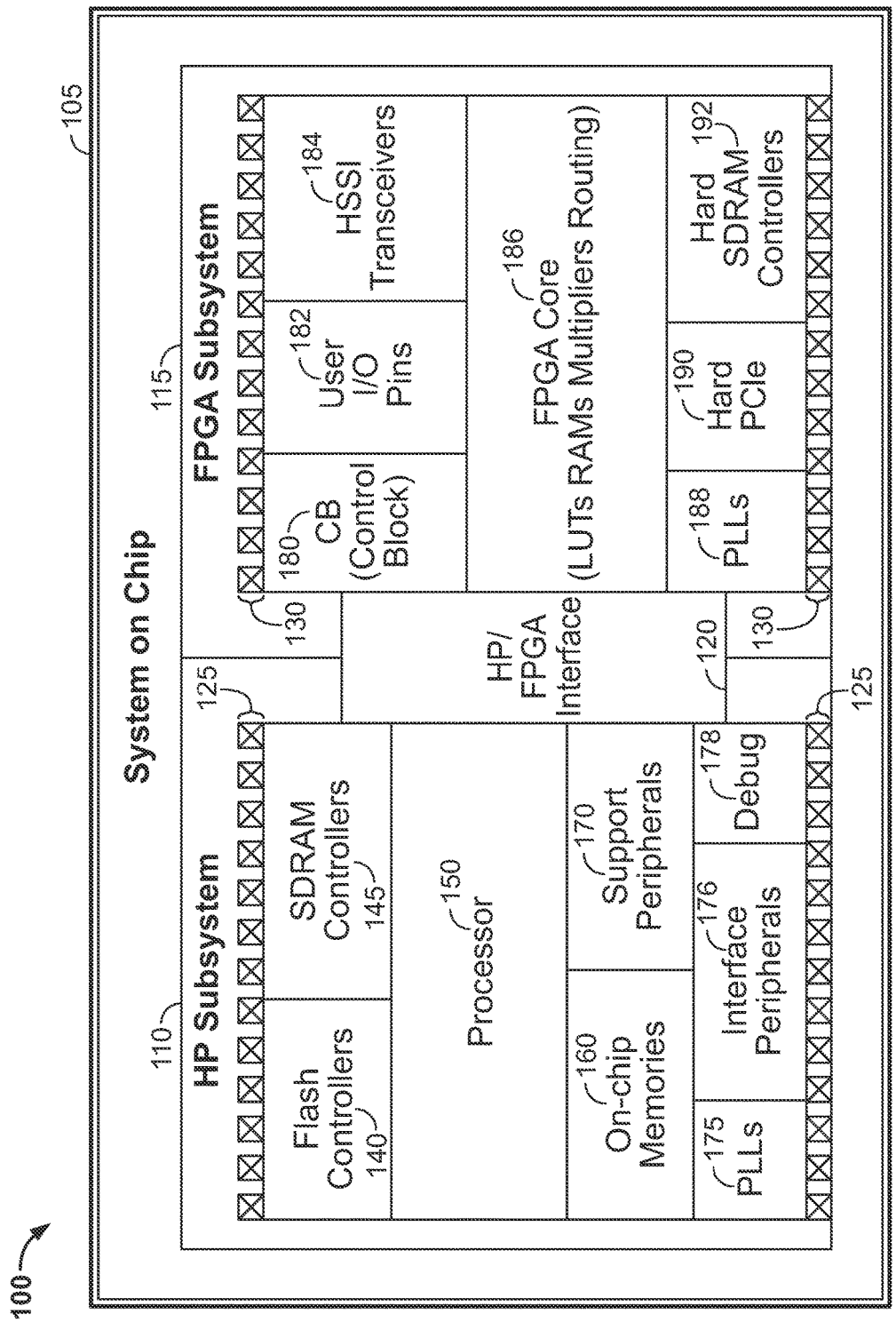
FIG. 1 is a simplified depiction of an integrated circuit SOC including a hard processor (HP) subsystem and a FPGA subsystem in accordance with some implementations.

Accordingly, this disclosure describes techniques for ensuring security in an integrated circuit system that includes a processor subsystem, which includes one or more processors, and a configurable-logic (e.g., FPGA) subsystem, which is capable of storing code executed by the processor.

This disclosure describes techniques for utilizing configurable-logic (e.g., FPGA) to control the process of booting a processor in an integrated circuit securely. Because the configurable-logic (e.g., FPGA) may be on the same die as the processor in the integrated circuit, the configurable-logic (e.g., FPGA) may be able to boot the processor inside the security boundary of the package containing the die. This may be accomplished in the following manner.

The configurable-logic (e.g., FPGA) may hold the processor in a secure (e.g., reset) state until it has loaded and authenticated the boot image that the processor may execute. The configurable-logic (e.g., FPGA) may also ensure that no outside agency can influence the boot process. This may include ensuring that the boot sequence is controlled (i.e., boot select over-ride) and ensuring that no other mechanisms can take over processor function (e.g., JTAG debug). The ability of the configurable-logic (e.g., FPGA) to write zeros to memory locations of the HP subsystem may be an additional feature that ensures that a non-secure state is not left behind on the processor from a prior boot by a Trojan application.

ROM code in the HP subsystem may be allowed to execute at system power up or upon reset. However, it may only operate to configure the configurable-logic (e.g., FPGA) from one of its image storage devices. The configurable-logic (e.g., FPGA) may then authenticate the image loaded into it. ROM code in the HP subsystem may wait for the configurable-logic (e.g., FPGA) to report that it is ready and that the image loaded on to the configurable-logic (e.g., FPGA) was authenticated. The ROM code may then jump to the boot image loaded into the configurable-logic (e.g., FPGA).

Specifically, techniques are presented for establishing trusted code within the integrated circuit system and for ensuring that the processor boots from the trusted code in a trusted manner. In particular, these techniques may be performed at a package level. For example, a package may contain a single or multiple dies soldered on to the same board. Advantageously, the techniques described herein may be more effective because the security boundary of a package may be more difficult to defeat than that of a board. The techniques described herein include at least three aspects.

First, the configurable logic and processor subsystems are placed in the same physical unit. For example, the configurable logic and processor subsystems may be placed on the same die or package. Second, the processor boots and configures the configurable-logic system in a trusted manner. Third, the configurable-logic subsystem forces the processor to reboot from the trusted code stored in the FPGA.

FIG. 1 is a simplified depiction of an integrated circuit SOC including a hard processor (HP) subsystem and a FPGA subsystem in accordance with some implementations. In particular, SOC 105 includes HP subsystem 110 and FPGA subsystem 115. Data and control signals are transmitted between the HP subsystem 110 and the FPGA subsystem 115 via HP/FPGA interface 120.

The HP subsystem 110 includes a processor subsystem 150 that includes one or more processors. In the case that the processor subsystem 150 includes at least two processors, the processor subsystem 150 may support both symmetric and asymmetric multiprocessing. The HP subsystem 110 further includes flash memory controllers 140 and synchronous dynamic random access memory (SDRAM) controllers 145 for managing data stored in various flash and SDRAM memories of the HP subsystem 110, for example, in on-chip memories 160. The HP subsystem 110 further includes interfaces for peripherals via interface peripherals 176. For example, in some implementations, the interface peripherals 176 includes interfaces to support one or more of a compact flash interface, a keyboard and mouse interface, a SD/MMC memory card interface, a DVI interface, and a PCI or PCI-express interface.

In addition, the HP subsystem 110 may include certain embedded peripherals on device as reflected by support peripherals 170. For example, in some implementations, the support peripherals 170 include an analog-to-digital converter and a digital-to-analog converter. The HP subsystem 110 may further include one or more phase locked loops (PLLs) for providing and maintaining clock signals for devices within the HP subsystem 110 and devices external to the HP subsystem 110 (e.g., devices interfaced to the HP subsystem 110 via device pins 125). The HP subsystem 110 may include various debug components in the debug region 178.

The FPGA subsystem 115 includes a programmable FPGA core 186 that includes resources for look up tables (LUTs), read only memory (RAM), multipliers, and data routing. Further, the FPGA subsystem 115 includes user I/O pins 182. The user I/O pins 182 are assigned to signals produced by the configured portion of the FPGA core 186. On the other hand, device pins 130 are used to interface the FPGA subsystem 115 with devices external to the FPGA core 186.

The FPGA subsystem 115 further includes hard-IP SDRAM controllers 192 for managing data stored in various SDRAM memories of the FPGA subsystem 115. The FPGA subsystem 115 may further include one or more phase locked loops (PLLs) 188 for providing and maintaining clock signals for devices within the FPGA subsystem 115 and devices external to the FPGA subsystem 115 (e.g., devices interfaced to the FPGA subsystem 115 via device pins 130). The FPGA subsystem 115 further includes high-speed serial interface (HSSI) circuitry 184 and a peripheral component interconnect express (PCIe) interface 190 implemented in hard-IP. The FPGA subsystem 115 includes a control block 180.

In general, the HP subsystem 110 and the FPGA subsystem 115 of the SOC 105 are implemented using physically distinct circuitries. In general, the HP subsystem 110 is capable of being booted from instructions stored in any suitable source, including the on-chip memories 160, from memory of the FPGA core 186, or from any suitable external device (e.g., a flash memory external device) interfaced with the HP subsystem 110 (e.g., through device pins 125). In general, the configurable logic of the FPGA code 186 may be configured by the processor subsystem 150 or from a suitable external device interfaced to the FPGA core 186 (e.g., through the device pins 130). In some implementations, the HP subsystem 110 and the FPGA subsystem 115 are powered via separate power supplies units. In such implementations, the HP subsystem 110 may be powered on whether or not the FPGA subsystem 115 is powered on.

Figure 2:
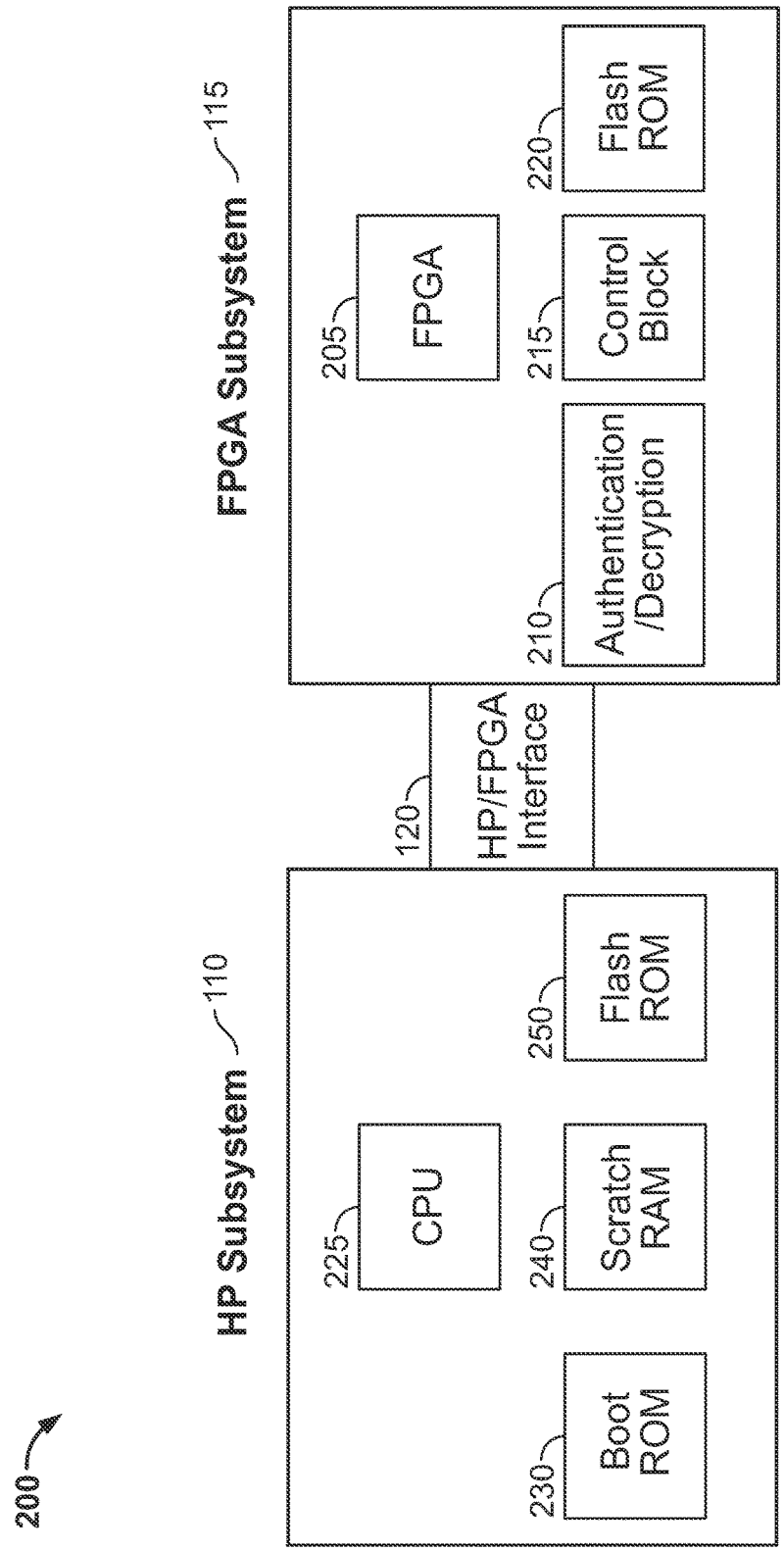
FIG. 2 is another simplified depiction of an integrated circuit SOC including a HP subsystem and a FPGA subsystem in accordance with some implementations.

FIG. 2 is another simplified depiction of an integrated circuit SOC including a HP subsystem and a FPGA subsystem in accordance with some implementations. Illustration 200 depicts the HP subsystem 110 and the FPGA subsystem 115 and the HP/FPGA interface 120 of FIG. 1. As depicted in FIG. 2, the HP subsystem 110 includes CPU 225 (which may represent one or more processors), boot ROM 230 memory, scratch RAM 240 memory, and flash ROM 250 memory. The FPGA subsystem 115 includes FPGA 205, authentication and decryption circuitry 210, a control block 215, and flash ROM 220 memory. In general, illustration 200 is consistent with illustration 100 and the two illustrations differ in explicit referring to only some of the elements present in each of the HP subsystem 110 and the FPGA subsystem 115.

Described next are techniques for establishing data security within an integrated circuit architecture in which resources of the FPGA subsystem 115 are used to establish that code executed by the one or more processors of the CPU 225 is secure. That is, rather than requiring that the HP subsystem 110 include dedicated resources to decrypt and/or authenticate code executed by the one or more processors of the CPU 225, the disclosed techniques exploit the decryption and authentication resources already present in the FPGA subsystem 115.

According to the first aspect for establishing a secure SOC, a secure physical boundary is established for the SOC 105 such that a software or hardware attack must penetrate the physical boundary as a condition to succeed.

The disclosed approach for establishing secure operation of the SOC 105 focuses on establishing the one or more processors of the CPU 225 as a "root of trust" in the SOC 105 (these one or more processors will henceforth collectively be referred as a "processor" for clarity of presentation). According to the second aspect for establishing a secure SOC, the CPU 225 boots and configures the FPGA subsystem 115 in a trusted manner. Accordingly, FIG. 3 depicts an illustrative process by which the FPGA subsystem 115 may initially boot the CPU 225 in a trusted manner, while FIG. 4, below, depicts an illustrative process by which the CPU 225 may configure the FPGA subsystem 115 in a trusted manner.

Figure 3:
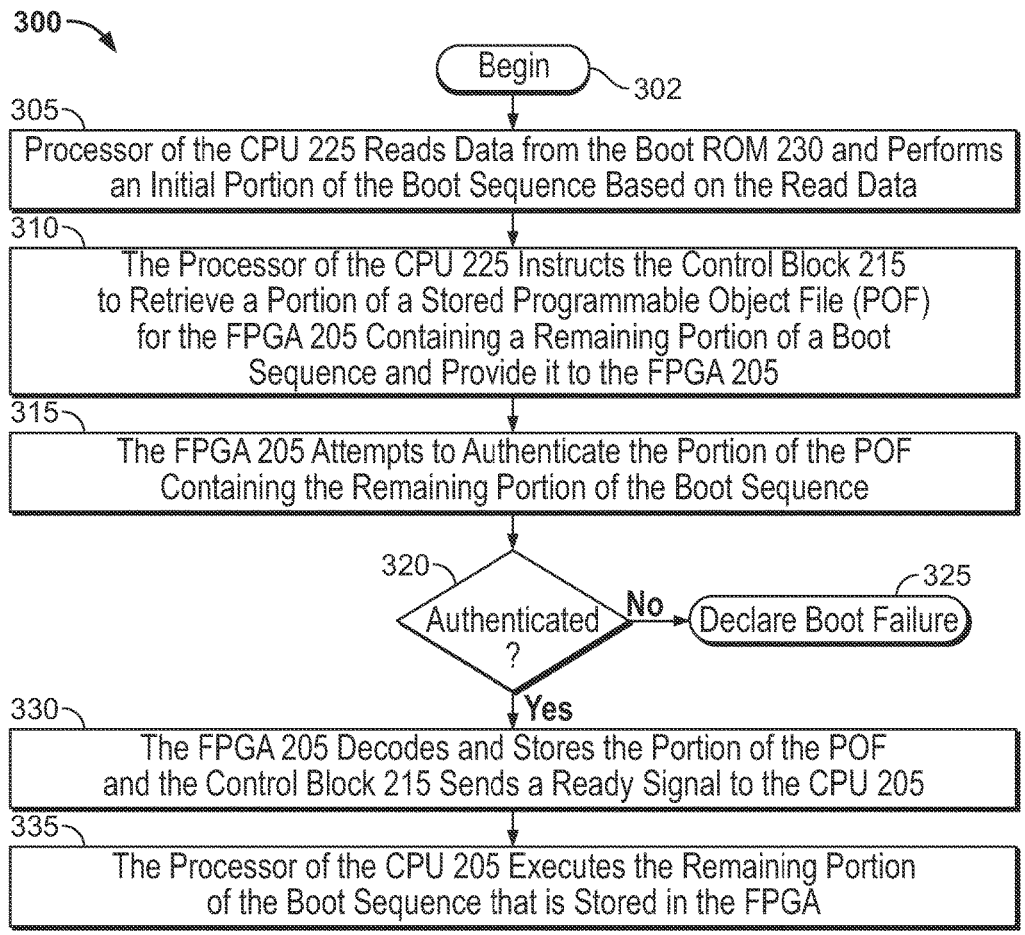
FIG. 3 depicts an illustrative process by which a FPGA subsystem initially boots a CPU of a HP subsystem in a trusted manner in accordance with some implementations.

Process 300 of FIG. 3 begins at step 302. The process 300 may begin in response to the CPU 225 receiving a boot command, e.g., from an device external to the SOC 105 or from a signal provided to the CPU 225 by the FPGA subsystem 115. At step 305, the processor of the CPU 225 reads initial boot data from the boot ROM 230 and executes an initial portion of a boot sequence based on the read data. Such an initial portion of the boot sequence based on data read from boot ROM 230 may be performed at power up or reset of the CPU 225. The CPU 225 may then wait for the FPGA subsystem 115 to report that it is ready and that a POF loaded on to the FPGA subsystem 115 has been authenticated. The CPU 225 may then jump to the boot image loaded into the FPGA subsystem 115 via the POF, as discussed in greater detail below.

Having performed the initial portion of the boot sequence, the process 300 proceeds to step 310. At the step 310, the processor of the CPU 225 instructs the control block 215 of the FPGA subsystem 115 to retrieve a portion of a stored programmable object file (POF) for the FPGA 205 that contains code for a remaining portion of the boot sequence and provide it to the FPGA 205. In various implementations, control block 215 may retrieve a portion of the stored POF autonomously or an external master circuitry may retrieve a portion of the stored POF and provide it to FPGA 205. The portion of the POF may be stored in, and thus obtained from, any suitable source. For example, in various implementations, the portion of the POF is obtained from storage in the boot ROM 230, flash ROM 250 of the HP subsystem 110, and flash ROM 220 of the FPGA subsystem 115, respectively.

In some arrangements, the POF file described above is created by a supplier of the SOC 105, who determines configuration code for the FPGA, signs the configuration code, and places the signed configuration code into a suitable memory location of the SOC 105 prior to shipping the SOC 105 to customers.

As described above in relation to the steps 305 and 310, the processor of the CPU 225 performs a first read of initial boot data from the boot ROM 230 then performs a second read of subsequent boot data from a stored POF file that contains code for a remaining portion of the boot sequence. In some arrangements, the HP subsystem 110 is programmable (e.g., via a programmable fuse) to perform the second read (i.e., of subsequent boot data) from either the boot ROM 230 or from a memory location storing a POF file. In these arrangements, the process 300 illustrates a case that the HP subsystem 110 is programmed (e.g., a programmable fuse is blown) so that the second read is performed from the stored POF file rather than from data stored in the boot ROM 230.

At step 315, the FPGA 205 attempts to authenticate the POF containing the remaining portion of the boot sequence. At a minimum, the FPGA 205 may authenticate the portion of the POF containing the remaining portion of the boot sequence. Otherwise, the entire POF containing the remaining portion of the boot sequence may be authenticated. At step 320, it is determined if the authentication is successful. If the authentication is determined to be successful at the step 320, then the process 300 proceeds to step 330. Otherwise, the process 300 proceeds to step 325, where a boot failure is declared and the process 300 terminates.

At step 330, the FPGA 205 decodes and stores the POF (which contains the remaining portion of the boot sequence and FPGA configuration data). The control block 215 then sends a ready signal to the CPU 205. The process 300 then proceeds to step 335. At the step 335, the processor of the CPU 205 executes the portion of the boot sequence that was stored in the FPGA at the step 330.

Figure 4:
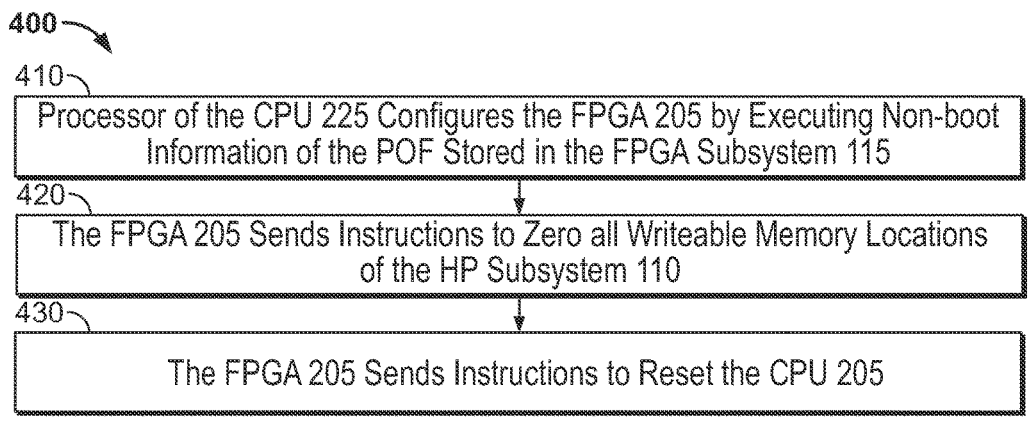
FIG. 4 depicts an illustrative process by which a CPU configures an FPGA subsystem in accordance with some implementations.

According to the third aspect for establishing a secure SOC, the configurable-logic subsystem forces the processor to reboot from (trusted) code stored in the FPGA. In particular, FIG. 4 depicts an illustrative process 400 by which the CPU 225 configures the FPGA subsystem 115 in a trusted manner. The process 400 may preferably be executed before the completion of the process 300. In some implementations, process 400 may be executed sequentially after the completion of the process 300.

Process 400 may be advantageous in situations where the CPU 225 may have become non-secure, for example, by executing user-loaded non-authenticated code. In such situations, process 400 may aid bringing back CPU 225 to a secure mode.

At step 410, the processor of the CPU 225 configures the FPGA 205 by executing the non-boot information contained in the POF stored in the FPGA subsystem 115. The execution of the non-boot information causes steps 420 and 430 of the process 400 to be executed. At the step 420, the FPGA 205 sends instructions to zero all writeable memory locations of the HP subsystem 110. For example, with reference to FIG. 2, scratch RAM 240 is zeroed.

In some implementations, the zeroing process is performed based on scrambling. That is, the data of every writable memory block of the HP subsystem 110 is scrambled so that the data stored in the block is practically unrecoverable and inaccessible to the CPU 205 or any component of the FPGA subsystem 115. The zeroing process is advantageous in preventing attacks (e.g., a virus) that may be laying in wait in the memory blocks of the HP subsystem 110 and for preventing a potential leakage of stored data. At the step 430, with the writable memory block of the HP subsystem 110 zeroed, the FPGA 205 sends instructions to reset (i.e., reboot) the CPU 205. The CPU 205 accordingly reboots and thus becomes secure.

Figure 5:
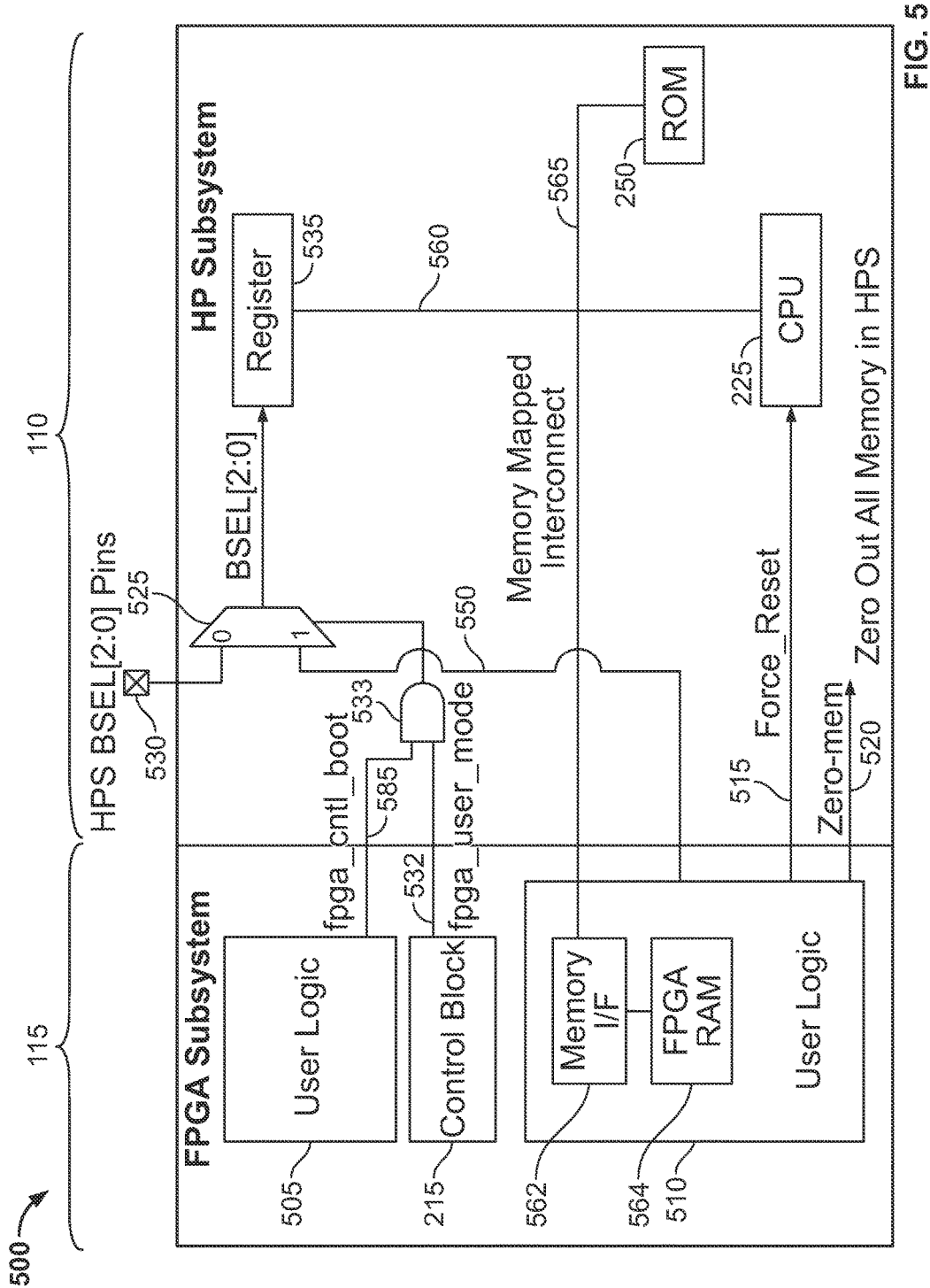
FIG. 5 depicts an illustrative hardware architecture by which an FPGA subsystem zeros memory contents of a HP subsystem and resets a CPU of the HP subsystem in accordance with some implementations.

FIG. 5 depicts an illustrative hardware architecture by which an FPGA subsystem zeros memory contents of a HP subsystem and resets a CPU of the HP subsystem in accordance with some implementations. This hardware architecture may advantageously be used to over-ride external boot select and ensure the HP subsystem 110 is held in reset mode until the FPGA subsystem 115 is in control.

In particular, the architecture 500 depicts the FPGA subsystem 115, which includes user logic 505 and user logic 510 both belonging to the FPGA 205 (see, e.g., FIG. 2) and the control block 215. The user logic 510 further includes a memory interface 562 and a dedicated FPGA RAM 564. The architecture 500 also depicts the HP subsystem 110, which includes the CPU 225, the flash ROM 250, a multiplexer 525, external input 530, register 535, and AND-gate 533.

The contents of the user logic 505 and 510 are configured based on execution of the stored POF by the processor of the CPU 225 as described above. In an arrangement, the architecture 500 is used to zero memory contents of the HP subsystem 110 and reset the CPU 225 of the HP subsystem 110 as follows. First, the FPGA subsystem 115 asserts a reset signal on line 515. The reset signal is provided to the CPU 225. Then, the FPGA subsystem asserts a signal to zero memory locations on line 520. Specifically, the signal to zero memory locations is provided to each memory block of the HP subsystem 110 the data of which is to be zeroed (e.g., scrambled). For example, the asserted signal on the line 520 is provided to the ROM 250 of the HP subsystem 110.

Once the memory locations are zeroed, the FPGA subsystem 115 proceeds to force a reset of the CPU 225. To do so, the user logic 510 asserts a high signal on line 550 to indicate that boot is to be initiated by the FPGA subsystem 115 (as opposed to the HP subsystem 110). Further, high signals are asserted on lines 585 and 532, thus producing a high signal at the output of the NAND gate 533. This signal enables the multiplexer 525 and a boot instruction is passed through register 535, via line 560, to the CPU 225. Accordingly, the CPU 225 starts a reset (i.e., reboot). The FPGA subsystem 115 then sets a signal on line 515 to a low level. In various implementations, resetting the CPU 225 re-boots the CPU 225 in a secure mode. Upon reset of the CPU 225, the FPGA subsystem 115 proceeds to assert signals (not shown), based on the stored POF, in the HP subsystem 110 such that the CPU 225 jumps directly to secure code in the FPGA subsystem 115 upon completing the boot sequence.

It will be understood that the foregoing is only illustrative of the principles of the invention, and that various modifications may be made by those skilled in the art without departing from the scope and spirit of the invention, and the present invention is limited only by the claims that follow.

What is claimed is:

1. An integrated circuit comprising:
 a hard processor subsystem comprising:
  processor circuitry comprising a processor; and
  a boot read only memory (ROM);
 a field programmable gate array (FPGA) subsystem comprising:
  FPGA circuitry comprising a FPGA core and a FPGA memory; and
 an interface coupled to the hard processor subsystem and the FPGA subsystem, wherein the interface is configured to transmit data and control signals between the hard processor subsystem and the FPGA subsystem;
 wherein the processor of the hard processor subsystem is configured to:
  execute a first set of boot instructions stored in the boot ROM of the hard processor subsystem to boot the processor; and
  read, via the interface, a second set of boot instructions from a program object file (POF) stored in the FPGA memory to boot the processor and execute the second set of boot instructions after the FPGA core has authenticated the POF and after the first set of boot instructions has been executed.

2. The integrated circuit of claim 1, wherein the FPGA core, in response to authenticating the POF, sends a signal to the processor circuitry indicating that the processor circuitry execute the second set of boot instructions.

3. The integrated circuit of claim 2, wherein the FPGA circuitry comprises data authentication circuitry for authenticating the POF and wherein the processor circuitry and the FPGA circuitry are located on the same package.

4. The integrated circuit of claim 3, wherein the boot ROM and the processor circuitry are located on the same die in the package.

5. The integrated circuit of claim 1, wherein the FPGA core, in response to failing to authenticate the POF, declares boot failure.

6. The integrated circuit of claim 1, wherein the FPGA core holds the processor circuitry in a secure state while the FPGA core authenticates the POF.

7. The integrated circuit of claim 1, wherein the FPGA core causes data stored in a writable memory block included in the processor circuitry to be zeroed to ensure the processor circuitry is in a secure state.

8. An integrated circuit comprising:
 a hard processor subsystem comprising processor circuitry, wherein the processor circuitry comprises a processor and a boot read only memory (ROM); and
 a field programmable gate array (FPGA) subsystem comprising FPGA circuitry, wherein the FPGA comprises a FPGA core and a FPGA memory; and
 an interface coupled to the hard processor subsystem and the FPGA subsystem, wherein the interface is configured to transmit data and control signals between the hard processor subsystem and the FPGA subsystem;
 wherein the FPGA circuitry of the FPGA subsystem:
  receives instructions in a program object file (POF);
  authenticates the POF using data authentication circuitry, wherein the POF is authenticated after a first set of instructions stored in the boot ROM is executed by the processor to boot the processor;
  sends a signal to the processor circuitry via the interface, said signal causing data stored in at least one writable memory block included in the processor circuitry to be scrambled; and
  resets the processor via the interface after scrambling the data stored in the at least one writeable memory block.

9. The integrated circuit of claim 8, wherein the FPGA core, in response to failing to authenticate the POF, declares boot failure.

10. The integrated circuit of claim 8, wherein the first set of boot instructions stored in the boot ROM is non-secure code.

11. The integrated circuit of claim 8, further comprising the processor executing a second set of boot instructions stored in the FPGA memory based on the POF.

12. The integrated circuit of claim 11, wherein the second set of boot instructions stored in the FPGA memory is secure code.

13. The integrated circuit of claim 8, wherein the boot ROM and processor circuitry are located on the same die.

14. A method for performing a secure boot in an integrated circuit comprising processor circuitry of a hard processor subsystem and field programmable gate array (FPGA) circuitry of an FPGA subsystem, the method comprising:
 executing, via the processor circuitry of the hard processor subsystem, a first set of boot instructions stored in a boot read only memory (ROM) of the processor circuitry to boot the processor circuitry; and
 reading, via the processor circuitry and an interface coupled to the hard processor subsystem and the FPGA subsystem, a second set of boot instructions from a program object file (POF) stored in a FPGA memory of the FPGA circuitry of the FPGA subsystem to boot the processor circuitry; and executing, via the processor circuitry, the second set of boot instructions after a FPGA core of the FPGA circuitry has authenticated the POF and after the first set of boot instructions has been executed.

15. The method of claim 14, further comprising:
in response to authenticating the POF, sending a signal to the processor circuitry indicating that the processor circuitry execute the second set of boot instructions.

16. The method of claim 15, wherein the FPGA circuitry comprises data authentication circuitry for authenticating the POF and wherein the processor circuitry and the FPGA circuitry are located on the same package.

17. The method of claim 16, wherein the boot ROM and the processor circuitry are located on the same die in the package.

18. The method of claim 14, further comprising:
in response to failing to authenticate the POF, declaring boot failure.

19. The method of claim 14, further comprising holding the processor circuitry in a secure state while the FPGA circuitry authenticates the POF.

* * * * *